(12) United States Patent
Liu et al.

(10) Patent No.: US 10,782,831 B2
(45) Date of Patent: Sep. 22, 2020

(54) SELF-CAPACITIVE TOUCH PANEL AND DISPLAY DEVICE

(71) Applicants: BOE Technology Group Co., Ltd., Beijing (CN); Hefei BOE Optoelectronics Technology Co., Ltd., Hefei, Anhui (CN)

(72) Inventors: Bo Liu, Beijing (CN); Xianjie Shao, Beijing (CN); Honggang Gu, Beijing (CN)

(73) Assignees: BOE Technology Group Co., Ltd., Beijing (CN); Hefei BOE Optoelectronics Technology Co., Ltd., Hefei (CN)

(*) Notice: Subject to any disclaimer, the term of this patent is extended or adjusted under 35 U.S.C. 154(b) by 67 days.

(21) Appl. No.: 16/147,930

(22) Filed: Oct. 1, 2018

(65) Prior Publication Data

US 2019/0187831 A1 Jun. 20, 2019

(30) Foreign Application Priority Data

Dec. 15, 2017 (CN) .......................... 2017 1 1352384

(51) Int. Cl.
| | |
|---|---|
| *G06F 3/044* | (2006.01) |
| *G06F 3/041* | (2006.01) |
| *G02F 1/1333* | (2006.01) |
| *G02F 1/1343* | (2006.01) |

(52) U.S. Cl.
CPC ............ *G06F 3/044* (2013.01); *G06F 3/0412* (2013.01); *G06F 3/0443* (2019.05); *G02F 1/13338* (2013.01); *G02F 1/134309* (2013.01); *G02F 2001/134345* (2013.01); *G02F 2201/121* (2013.01)

(58) Field of Classification Search
None
See application file for complete search history.

(56) References Cited

U.S. PATENT DOCUMENTS

| | | | | |
|---|---|---|---|---|
| 2013/0033439 A1* | 2/2013 | Kim | ................... | G02F 1/13338 345/173 |
| 2015/0370114 A1* | 12/2015 | Du | ...................... | G02F 1/13338 349/12 |
| 2016/0357337 A1* | 12/2016 | Li | ......................... | G06F 3/0416 |

* cited by examiner

*Primary Examiner* — Christopher J Kohlman
(74) *Attorney, Agent, or Firm* — Arent Fox LLP; Michael Fainberg

(57) ABSTRACT

Disclosed are a self-capacitive touch panel and a display device. The self-capacitive touch panel includes a display area including a plurality of data lines, touch electrodes and common electrodes, wherein orthographic projections of the touch electrodes and the data liens onto the self-capacitive touch panel are not overlapped with each other; the common electrodes are arranged at a layer same as a layer on which the touch electrodes are and insulated from the touch electrodes, and orthographic projections of the common electrodes and the data lines onto the self-capacitive touch panel are overlapped with each other.

7 Claims, 9 Drawing Sheets

SELF-CAPACITIVE TOUCH PANEL AND DISPLAY DEVICE

CROSS-REFERENCE TO RELATED APPLICATION

This application claims priority of Chinese Patent Application No. 201711352384.3, filed on Dec. 15, 2017, which is hereby incorporated by reference in its entirety.

FIELD

The present disclosure relates to the field of display technologies, and particularly to a self-capacitive touch panel and a display device.

BACKGROUND

In the existing self-capacitive in-cell touch panel, a touch electrode is the same as a common electrode, so that the common electrode and the touch electrode receive a common electrode driver signal (generally referred to as a VCOM signal) in a display period of time; and the touch electrode receives a touch driver signal (generally referred to as a Tx signal) in a touch period of time, that is, the touch electrode is reused as a common electrode in the display period of time.

SUMMARY

An embodiment of the disclosure provides a self-capacitive touch panel including a display area including a plurality of data lines, touch electrodes and common electrodes, wherein orthographic projections of the touch electrodes and the data liens onto the self-capacitive touch panel are not overlapped with each other; the common electrodes are arranged at a layer same as a layer on which the touch electrodes are and insulated from the touch electrodes, and orthographic projections of the common electrodes and the data lines onto the self-capacitive touch panel are overlapped with each other.

Optionally, in the self-capacitive touch panel above according to the embodiment of the disclosure, an extension direction of spaces between the touch electrodes and the common electrodes is parallel to an extension direction of the data lines.

Optionally, in the self-capacitive touch panel above according to the embodiment of the disclosure, the display area further includes a plurality of pixels, each of the plurality of pixels includes a plurality of sub-pixels, wherein:

the touch electrodes and the common electrodes correspond respectively to different sub-pixel areas.

Optionally, in the self-capacitive touch panel above according to the embodiment of the disclosure, all the common electrodes correspond to the sub-pixel areas of same color in each of the pixels.

Optionally, in the self-capacitive touch panel above according to the embodiment of the disclosure, each of the pixels includes three sub-pixels, and the touch electrodes correspond to two adjacent sub-pixel areas in each of the pixels.

Optionally, in the self-capacitive touch panel above according to the embodiment of the disclosure, each of the pixels includes three sub-pixels, and the touch electrodes correspond to two sub-pixel areas spaced from each other in any one of the pixels.

Optionally, in the self-capacitive touch panel above according to the embodiment of the disclosure, the self-capacitive touch panel further includes first traveling lines connected with the common electrodes, and second traveling lines connected with the touch electrodes, wherein:

the first traveling lines are configured to provide a common electrode driver signal; and the second traveling lines are configured to provide a touch driver signal in a touch period of time, and to provide a common electrode drive signal in the display period of time.

Optionally, in the self-capacitive touch panel above according to the embodiment of the disclosure, the first traveling line and the second traveling line corresponding to each of the pixels are located respectively on different sides of the each of the pixels.

An embodiment of the disclosure provides a display device including the self-capacitive touch panel according to any one of the embodiments above of the disclosure.

BRIEF DESCRIPTION OF THE DRAWINGS

In order to make the technical solutions according to the embodiments of the disclosure more apparent, the drawings to which reference will be made in the description of the embodiments will be introduced below in brief, and apparently the drawings to be described below illustrate only a part of the embodiments of the disclosure, and those ordinarily skilled in the art can further derive from these drawings other drawings without any inventive effort.

DETAILED DESCRIPTION OF THE EMBODIMENTS

Figure 1:
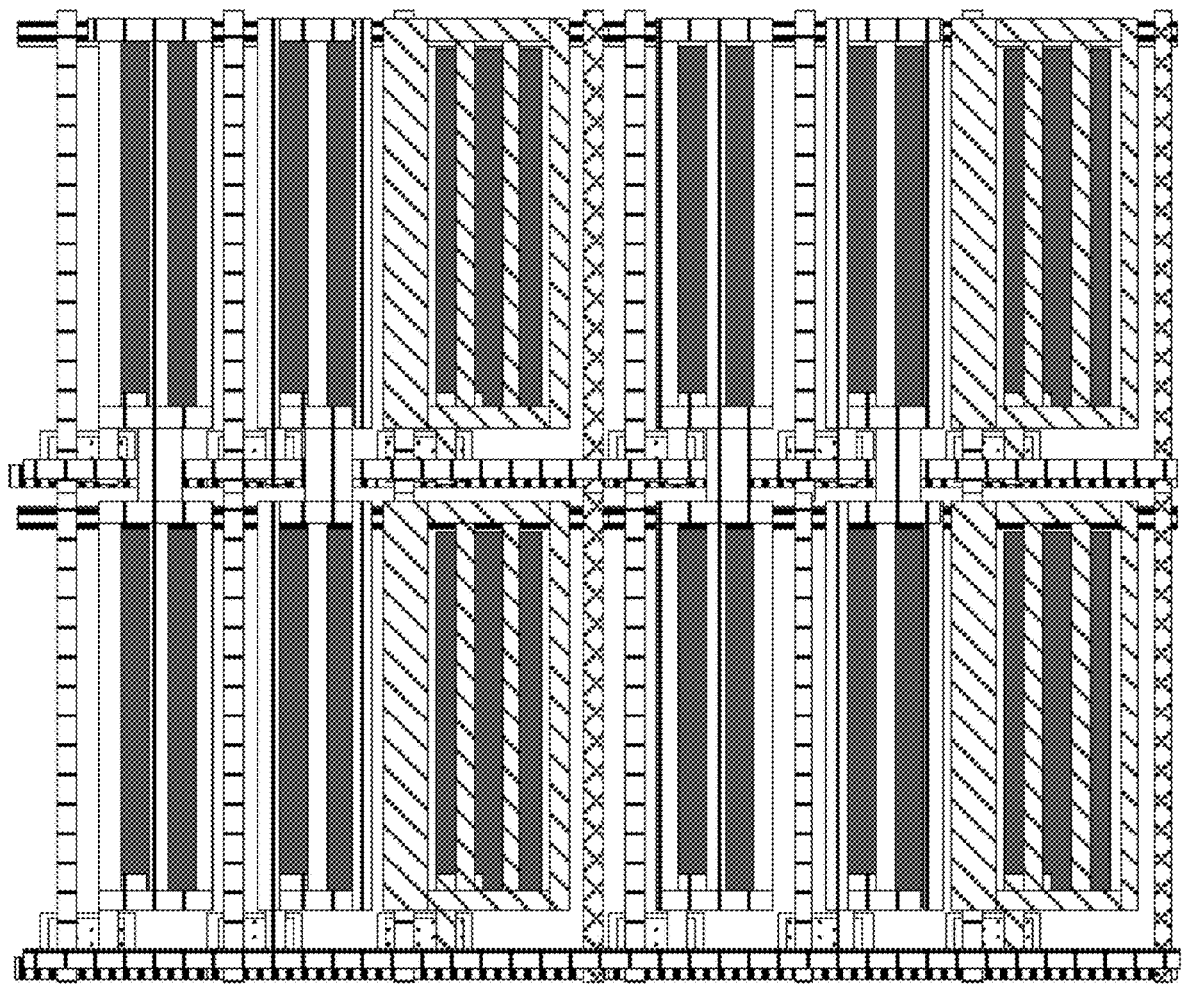
FIG. 1 is a schematic structural diagram of a touch panel according to an embodiment of the disclosure.

A general load of the touch electrode (which receives a VCOM signal in a display period of time) arises from a coupling capacitor (Cdc) between the touch electrode and a data line, and the load arising from the Cdc is the highest load throughout the touch electrode, where this load tends to affect a detection effect in the touch period of time.

The embodiments of the disclosure provide a self-capacitive touch panel and a display device so as to reduce the capacitance of a coupling capacitor between a touch electrode and a data line to some extent to thereby lower a load of the touch electrode, thus improving the frequency of scanning a touch signal in a touch period of time, and a detection effect in the touch period of time.

It shall be noted that in the embodiments of the disclosure, a touch electrode can be reused as a common electrode in a display period of time, and the common electrode can only be used as a common electrode, that is, both the common electrode and the touch electrode receives a common electrode driver signal in the display period of time; and the touch electrode receives a touch driver signal, but the common electrode does not receive any touch drive signal, in a touch period of time.

In a typical self-capacitive touch panel, a touch electrode layer is arranged above a data line layer, and if orthographic projections of a touch electrode and a data line onto the self-capacitive touch panel are overlapped with each other, then a coupling capacitor will be formed, and if their facing area is larger, then the capacitance of the coupling capacitor will be larger; and a load may arise from the coupling capacitor, thus affecting a touch effect.

A self-capacitive touch panel according to an embodiment of the disclosure includes a display area including a plurality of data lines and touch electrodes, where each touch electrode can be reused as a common electrode in a display period of time, and orthographic projections of the touch electrodes and the data lines onto the self-capacitive touch panel are not overlapped with each other, so that the capacitances of the coupling capacitors between the touch electrodes and the data lines can be reduced to some extent to thereby lower loads of the touch electrodes so as to improve the frequency of scanning a touch signal in a touch period of time, and a detection effect in the touch period of time.

Furthermore, in the self-capacitive touch panel according to the embodiment of the disclosure, the display area further includes a plurality of pixels distributed in an array, and common electrodes arranged at a layer same as the layer on which the the touch electrodes are, and insulated from the touch electrodes, and each pixel includes a plurality of sub-pixels, where the touch electrodes and the common electrodes correspond respectively to different sub-pixel areas. For example, each pixel includes three sub-pixels, where a common electrode is arranged corresponding to one sub-pixel area, and touch electrodes are arranged corresponding to the other two sub-pixel areas. A particular arrangement pattern can be designed as needed in reality, although the embodiment of this disclosure will not be limited thereto.

In the following description, a pixel includes three sub-pixels, for example. Of course, a pixel can alternatively include a larger number of sub-pixels in a larger number of colors. In the following embodiments, a sub-pixel includes red, green, and blue sub-pixels.

Some embodiments relate to a design for improving driving of a self-capacitive touch panel. In the related art, typically a touch electrode correspond to a pixel area which is an integral structure, and each sub-pixel corresponds to a data line, that is, a number of data lines are arranged immediately below the touch electrode; and since there is a facing area between a touch electrode and a data line, a coupling capacitor is formed, thus increasing a load of the touch electrode, which will affect a touch effect.

Figure 2:
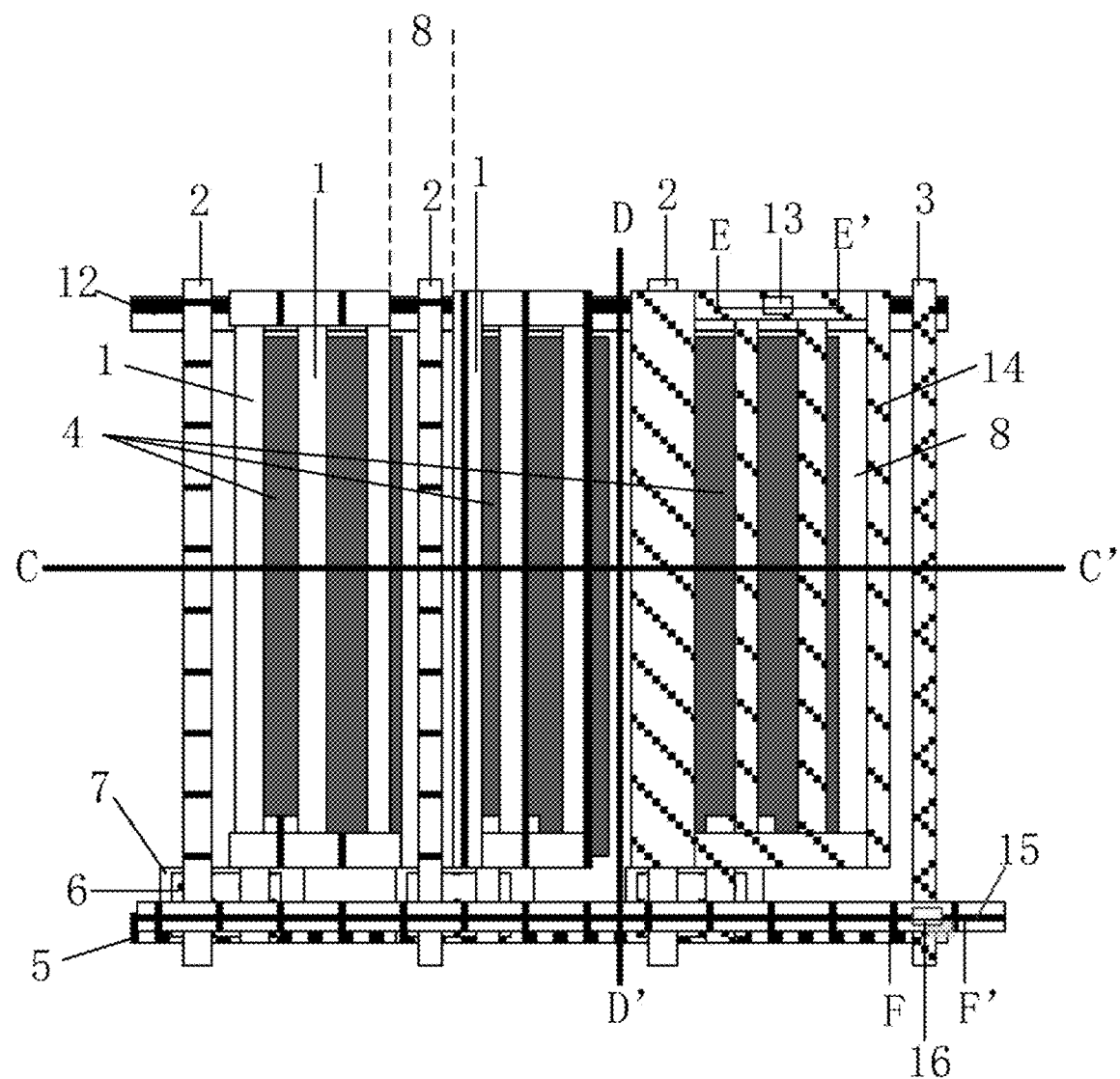
FIG. 2 is a first schematic structural diagram of a pixel in the touch panel according to the embodiment of the disclosure.
Figure 3:
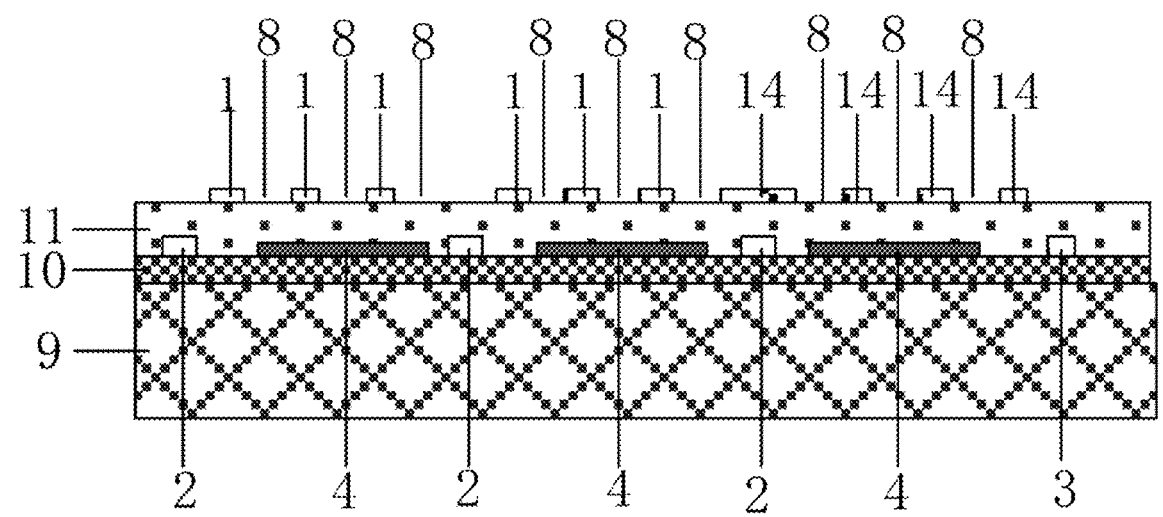
FIG. 3 is a schematic structural diagram of a section along the CC' line as illustrated in FIG. 2.
Figure 4:
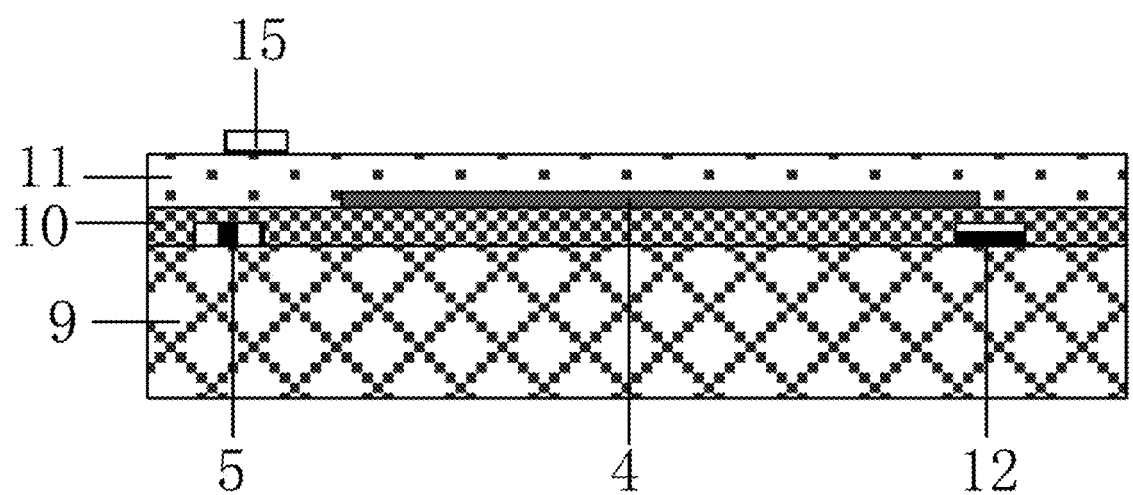
FIG. 4 is a schematic structural diagram of a section along the DD' line as illustrated in FIG. 2.

FIG. 2 to FIG. 4 illustrates the self-capacitive touch panel according to this embodiment, where the self-capacitive touch panel includes a glass substrate of an array substrate (a TFT glass substrate) 9, a Gate Insulator (GI) layer 10 located on the same side as the TFT glass substrate 9, and a Passivation (PVA) layer 11 located on the side of the GI layer 10 away from the TFT glass substrate 9; and data lines 2, pixel electrodes 4, active layers 6, and sources 7, which are arranged on the side of the GI layer 10 away from the TFT glass substrate 9, gate lines 5 arranged at the GI layer 10, touch electrodes 1 and common electrodes 14 arranged on the side of the PVA layer 11 away from the TFT glass substrate 9, touch signal lines 3 arranged at the layer same as the layer on which the pixel electrodes 4 are, first traveling lines 12 arranged at the layer same as the layer on which the gate lines 5 are, and touch electrode transfer lines 15 (i.e., second traveling lines) arranged at the layer same as layer on which the touch electrodes 1 are.

FIG. 1 and FIG. 2 illustrates the self-capacitive touch panel according to this embodiment, where each pixel is defined as a unit, for example, so each pixel includes three sub-pixels, a pixel electrode 4 is arranged respectively in an area corresponding to each sub-pixel, and a common electrode block located above a data line 2 in the pixel is segmented into a touch electrode 1 and a common electrode 14 along the slit space 8. For example, as illustrated in FIG. 2, an electrode in sub-pixel areas corresponding to two pixel electrodes on the left to the DD' line is a touch electrodes 1, and an electrode in a sub-pixel area corresponding to a pixel electrode 4 on the right to the DD' line is a common electrode 14. In a touch period of time, the touch electrode 1 receives a touch drive signal, and the common electrode 14 does not receive any touch driver signal; and in a display period of time, both the touch electrode 1 and the common electrode 14 receive a common electrode driver signal, that is, the touch electrode 1 is reused as a common electrode.

Furthermore, each sub-pixel corresponds to a data line 2, and orthographic projections of a touch electrode 1 and a data line 2 onto the self-capacitive touch panel are not overlapped with each other; and for example, as illustrated in FIG. 2, a slit space 8 is arranged between two adjacent touch electrodes 1 on the left to the DD' line, that is, the slit space 8 is arranged at the position immediately below which a data line 2 is arranged at the touch electrode layer, so that orthographic projections of the touch electrode 1 and the data line 2 onto the self-capacitive touch panel are not overlapped with each other, and in this way, there is no facing area between the touch electrode 1 and the data line 2 in a touch period of time, so the capacitance of a coupling capacitor formed between the touch electrode 1 and the data line 2 can be reduced to some extent to thereby lower a load of the touch electrode 1.

Optionally, in the self-capacitive touch panel according to the embodiment of the disclosure, as illustrated in FIG. 2, orthographic projections of the common electrode 14 and the data line 2 onto the self-capacitive touch panel are overlapped with each other, so that when there is no facing area between the touch electrode 1 and the data line 2, the common electrode 14 arranged at the same layer as the touch electrode 1 is arranged above the data line 2, so that the common electrode 14 covers the data line 2 in the direction perpendicular to the touch panel to thereby shield current or an electric field produced by the data line 2, so as to further reduce the capacitance of a coupling capacitance between the touch electrode 1 and the data line 2, thus lowering a load of the touch electrode 1.

Optionally, in the self-capacitive touch panel according to the embodiment of the disclosure, as illustrated in FIG. 2, the extension direction of the space (i.e., the slit space 8) between the touch electrode 1 and the common electrode 14 can be parallel to the extension direction of the data line 2.

Optionally, in the self-capacitive touch panel according to the embodiment of the disclosure, as illustrated in FIG. 2, a pixel electrode 4 is arranged respectively in an area corresponding to each sub-pixel, and orthographic projections of the pixel electrode 4 and the touch electrode 1 onto the self-capacitive touch panel are overlapped with each other.

Furthermore, in the self-capacitive touch panel according to the embodiment of the disclosure, the self-capacitive touch panel further includes: first traveling lines 12 connected with the common electrodes 14, and second traveling lines 15 connected with the touch electrodes 1, where the first traveling lines 12 are configured to provide the common electrodes 14 with a common electrode driver signal, and the second traveling lines 15 are configured to provide the touch electrodes 1 with a touch driver signal in a touch period of time, and to provide the touch electrodes 1 with a common electrode driver signal in a display period of time.

Figure 5:
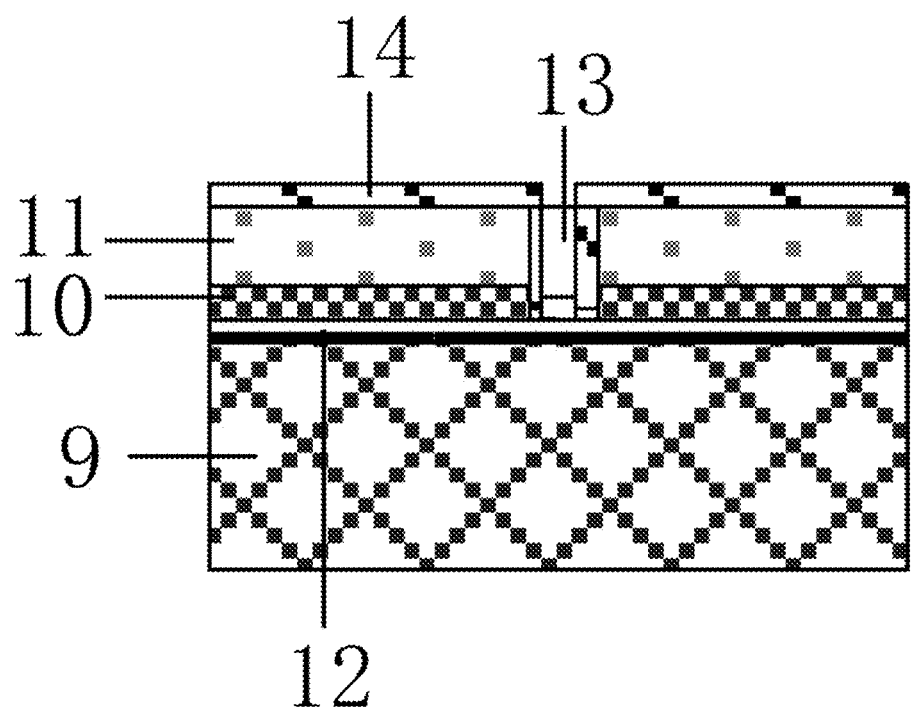
FIG. 5 is a schematic structural diagram of a section along the EE' line as illustrated in FIG. 2.

Optionally, as illustrated in FIG. 2 to FIG. 5, '2' refer to a data line, '8' refers to a slit space (located in an adjacent sub-pixel) between a common electrode 14 and a touch electrode 1, and '12' refers to a common electrode transfer line (i.e., a first traveling line); and the first traveling line is connected with the common electrode 14 corresponding to a sub-pixel in the same pixel through a through-hole 13 arranged at the GI layer 10 and the PVA layer 11, that is, the first traveling line 12 is electrically connected with the common electrode 14 through the through-hole 13 as illustrated in FIG. 5. Each pixel corresponds to a first traveling line 12, and each first traveling line 12 is electrically connected with a common electrode metal frame (not illustrated) on the periphery of the display area of the touch panel, and connected with a controller (not illustrated) through the metal frame, where the controller can be an Integrated Circuit (IC), for example, so that the IC can output a common electrode driver signal to the common electrode 14 on the first traveling line 12 in a display period of time.

Figure 6:
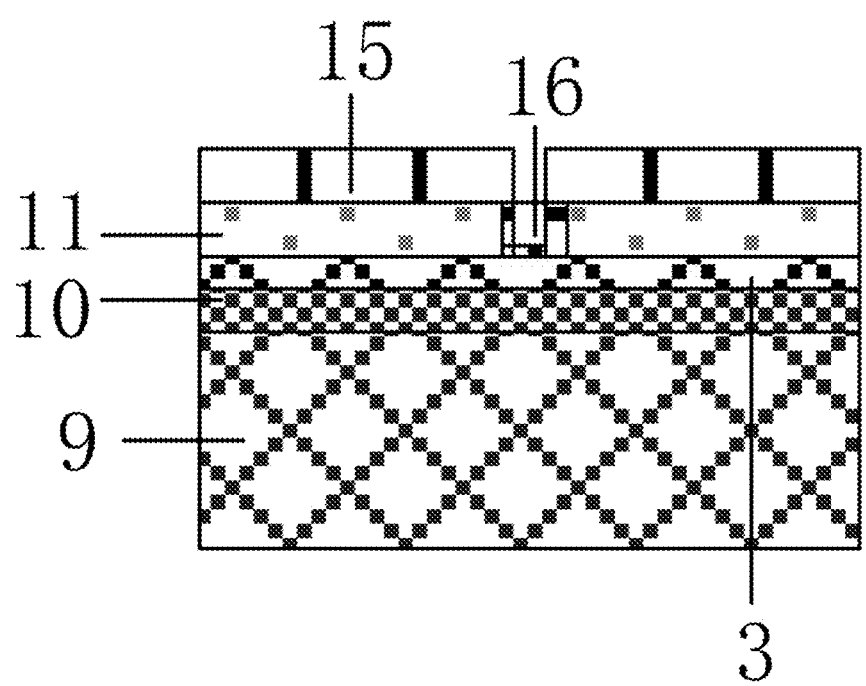
FIG. 6 is a schematic structural diagram of a section along the FF' line as illustrated in FIG. 2.

Furthermore, as illustrated in FIG. 2 to FIG. 6, '3' refers to a longitudinally arranged touch signal line, each column of pixels corresponds to a touch signal line 3, and '15' refers to a transversely arranged touch electrode transfer line (i.e., a second traveling line) configured to electrically connect a touch electrode 1 corresponding to sub-pixel areas in the same pixel. As illustrated in FIG. 6, the touch signal lines 3 and the second traveling lines 15 are connected through the through-holes 16 arranged at the PVA layer 11, and the touch signal lines 3 are connected with a controller arranged on the periphery of the touch panel, where the controller can be an IC, for example, and in a touch period of time, the IC provides the touch electrodes 1 with a touch driver signal on the touch signal lines 3, and the second traveling lines 15 connected with the touch signal lines 3, but the common electrodes 14 are not connected with the touch signal lines 3, so the common electrodes 14 do not receive any touch driver signal. In a display period of time, the IC provides the touch electrodes 1 with a common electrode driver signal on the touch signal lines 3 so that the touch electrodes 1 are reused as common electrodes in the display period of time.

Optionally, in the self-capacitive touch panel according to the embodiment of the disclosure, as illustrated in FIG. 2, the touch signal lines 3 are arranged perpendicular to the first traveling lines 12 and the second traveling lines 15. Of course, they can alternatively be arranged otherwise, and a particular arrangement pattern can be designed as needed in reality, although the embodiment of this disclosure will not be limited thereto.

Optionally, in the self-capacitive touch panel according to the embodiment of the disclosure, as illustrated in FIG. 2, a first traveling line 12 and a second traveling line 15 corresponding to any pixel are located respectively on different sides of the pixels. Of course, they can alternatively be arranged otherwise, and a particular arrangement pattern can be designed as needed in reality, although the embodiment of this disclosure will not be limited thereto.

Optionally, in the self-capacitive touch panel according to the embodiment of the disclosure, a touch electrode arranged corresponding to sub-pixel areas in each pixel can be connected with a corresponding second traveling line 15. Of course, alternatively touch electrodes 1 arranged corresponding to sub-pixel areas in a plurality of pixels can be connected with the same second traveling line 1, and a particular arrangement pattern can be designed as needed in reality, although the embodiment of this disclosure will not be limited thereto.

In summary, in this embodiment, for each pixel, a common electrode above a data line in the pixel is segmented into a touch electrode and a common electrode, and orthographic projections of the touch electrode and the data line onto the self-capacitive touch panel are not overlapped with each other, so that there is no facing area between the touch electrode and the data line, so the capacitance of a coupling capacitor between the touch electrode and the data line can be reduced to some extent to thereby lower a load of the touch electrode so as to charge the touch electrode more quickly and better, thus improving the frequency of scanning a touch signal in a touch period of time, and a detection effect in the touch period of time; and since the touch electrode is charged more quickly and better, display non-uniformity in a product with a high Pixels Per Inch (PPI) can be improved.

Some embodiments relate to a self-capacitive touch panel as illustrated in FIG. 7 to FIG. 11, and the self-capacitive touch panel includes a glass substrate of an array substrate (a TFT glass substrate) 9, a Gate Insulator (GI) layer 10 located on the same side as the TFT glass substrate 9, and a Passivation (PVA) layer 11 located on the side of the GI layer 10 away from the TFT glass substrate 9; and data lines 2, pixel electrodes 4, active layers 6, and sources 7, which are arranged on the side of the GI layer 10 away from the TFT glass substrate 9, gate lines 5 arranged at the GI layer 10, touch electrodes 1 and common electrodes 14 arranged on the side of the PVA layer 11 away from the TFT glass substrate 9, touch signal lines 3 arranged at the same layer as the pixel electrodes 4, first traveling lines 12 arranged at the same layer as the gate lines 5, and touch electrode transfer lines 15 arranged at the same layer as the touch electrodes 1.

Figure 7:
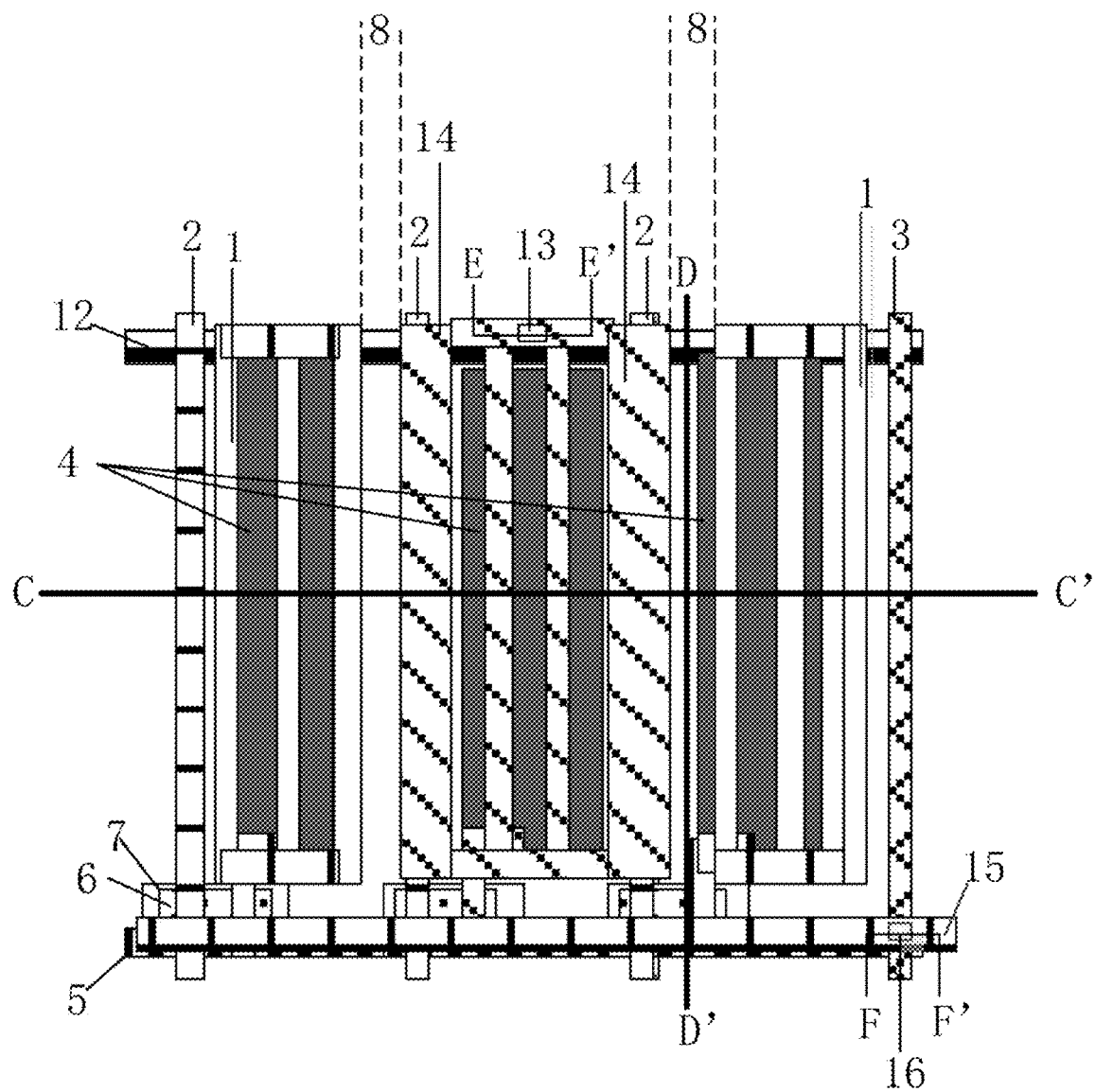
FIG. 7 is a second schematic structural diagram of a pixel in the touch panel according to the embodiment of the disclosure.
Figure 8:
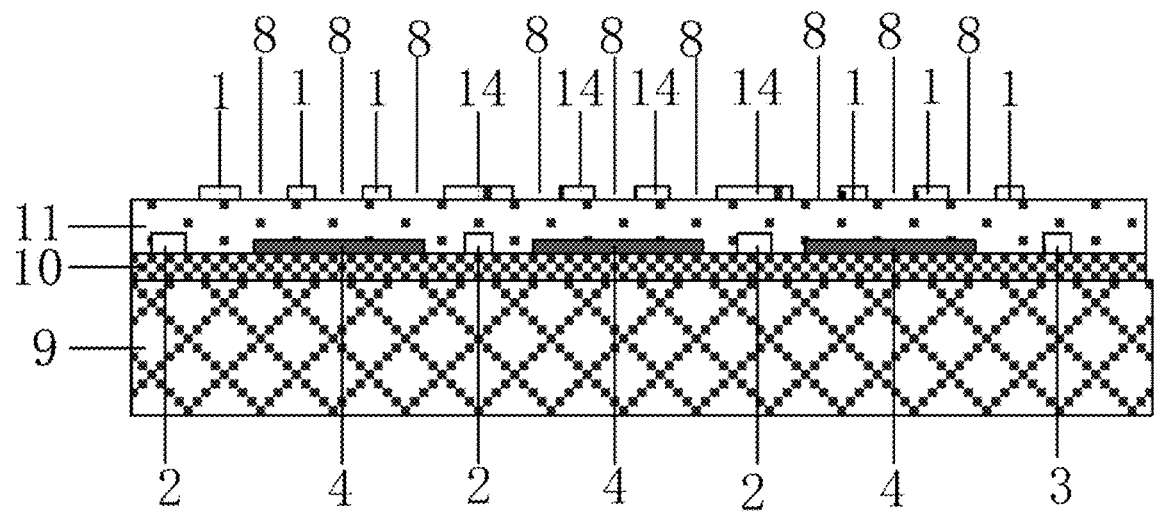
FIG. 8 is a schematic structural diagram of a section along the CC' line as illustrated in FIG. 7.
Figure 9:
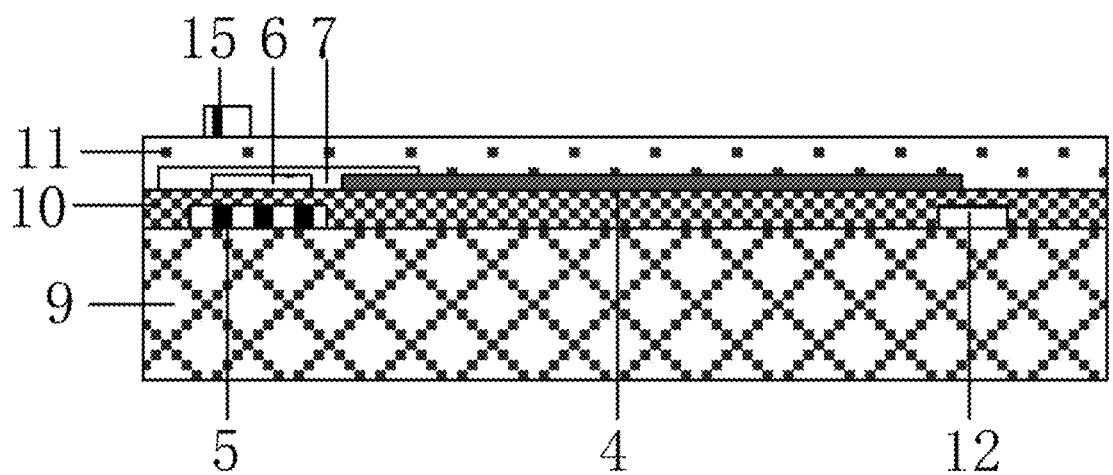
FIG. 9 is a schematic structural diagram of a section along the DD' line as illustrated in FIG. 7.

FIG. 7 to FIG. 11 illustrates the self-capacitive touch panel according to this embodiment, where each pixel is defined as a unit, for example, so each pixel includes three sub-pixels, a pixel electrode 4 is arranged respectively in an area corresponding to each sub-pixel, and a common electrode block located above a data line 2 in the pixel is segmented into the touch electrodes 1 and the common electrodes 14 along the slit space 8. For example, as illustrated in FIG. 7, an electrode in a sub-pixel area corresponding to a middle pixel electrode 4 is a common electrode 14, and electrodes in sub-pixel areas corresponding to middle pixel electrode 4 on the left and the right to the middle pixel electrode 4 are touch electrodes 1. In a touch period of time, the touch electrodes 1 receive a touch drive signal, and the common electrode 14 does not receive any touch driver signal; and in a display period of time, both the touch electrodes 1 and the common electrode 14 receive a common electrode driver signal, that is, the touch electrodes 1 are reused as common electrodes.

Furthermore, each sub-pixel corresponds to a data line 2, and orthographic projections of a touch electrode 1 and a data line 2 onto the self-capacitive touch panel are not overlapped with each other; and for example, as illustrated in FIG. 7, slit spaces 8 are arranged between the leftmost touch electrode 1 and the middle common electrode 14, and between the rightmost touch electrode 1 and the middle common electrode 14, that is, the slit spaces 8 are arranged at the positions immediately below which a data line 2 is arranged at the touch electrode layer, so that orthographic projections of the touch electrodes 1 and the data line 2 onto the self-capacitive touch panel are not overlapped with each other, and in this way, there is no facing area between the touch electrodes 1 and the data line 2 in a touch period of time, so the capacitance of a coupling capacitor formed between the touch electrodes 1 and the data line 2 can be reduced to some extent to thereby lower loads of the touch electrodes 1.

Optionally, in the self-capacitive touch panel according to the embodiment of the disclosure, as illustrated in FIG. 7, orthographic projections of the common electrode 14 and the data line 2 onto the self-capacitive touch panel may be overlapped with each other, so that when there is no facing area between the touch electrodes 1 and the data line 2, the common electrode 14 arranged at the same layer as the touch electrodes 1 is arranged above the data line 2, so that the common electrode 14 covers the data line 2 in the direction perpendicular to the touch panel to thereby shield current or an electric field produced by the data line 2, so as to further reduce the capacitance of a coupling capacitance between the touch electrodes 1 and the data line 2, thus lowering loads of the touch electrodes 1.

Optionally, in the self-capacitive touch panel according to the embodiment of the disclosure, as illustrated in FIG. 7, the extension direction of the space (i.e., the slit space 8) between the touch electrode 1 and the common electrode 14 can be parallel to the extension direction of the data line 2.

Optionally, in the self-capacitive touch panel according to the embodiment of the disclosure, as illustrated in FIG. 7, a pixel electrode 4 is arranged respectively in an area corresponding to each sub-pixel, and orthographic projections of the pixel electrode 4 and the touch electrode 1 onto the self-capacitive touch panel are overlapped with each other.

Furthermore, in the self-capacitive touch panel according to the embodiment of the disclosure, the self-capacitive touch panel further includes: first traveling lines 12 connected with the common electrodes 14, and second traveling lines 15 connected with the touch electrodes 1, where the first traveling lines 12 are configured to provide the common electrodes 14 with a common electrode driver signal, and the second traveling lines 15 are configured to provide the touch electrodes 1 with a touch driver signal in a touch period of time, and to provide the touch electrodes 1 with a common electrode driver signal in a display period of time.

Figure 10:
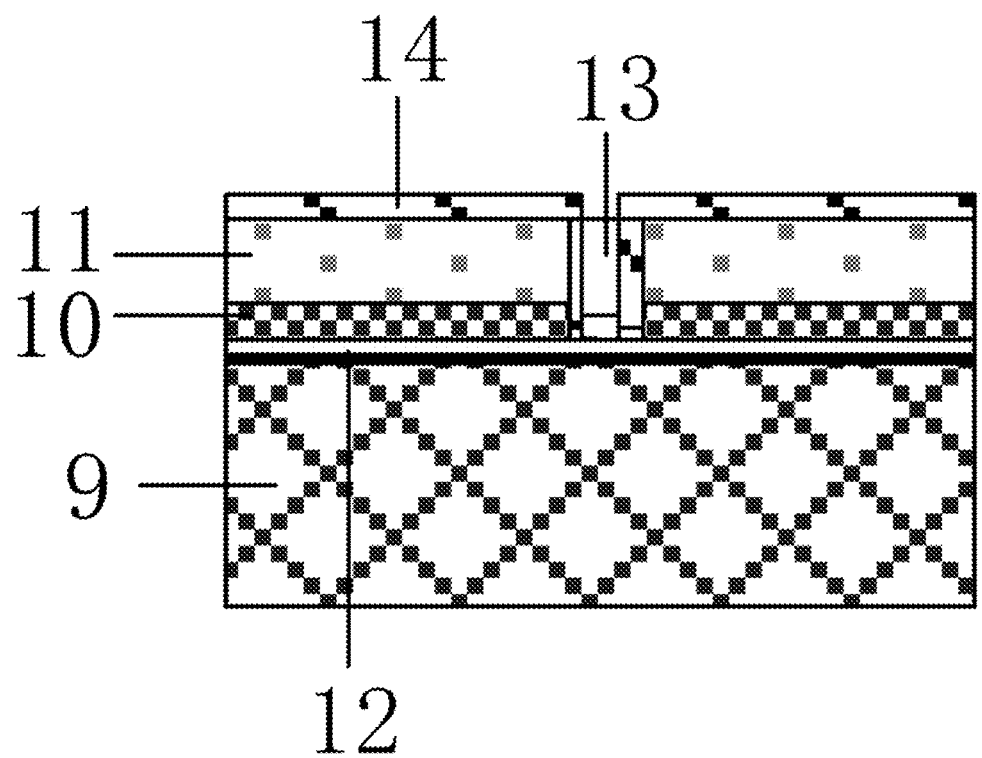
FIG. 10 is a schematic structural diagram of a section along the EE' line as illustrated in FIG. 7.

Optionally, as illustrated in FIG. 7 to FIG. 10, '2' refer to a data line, '8' refers to a slit space (located in an adjacent sub-pixel) between a common electrode 14 and a touch electrode 1, and '12' refers to a common electrode transfer line (i.e., a first traveling line); and the first traveling line is connected with the common electrode 14 corresponding to a sub-pixel in the same pixel through a through-hole 13 arranged at the GI layer 10 and the PVA layer 11, that is, the first traveling line 12 is electrically connected with the common electrode 14 through the through-hole 13 as illustrated in FIG. 10. Each pixel corresponds to a first traveling line 12, and each first traveling line 12 is electrically connected with a common electrode metal frame (not illustrated) on the periphery of the display area of the touch panel, and connected with a controller (not illustrated) through the metal frame, where the controller can be an Integrated Circuit (IC), for example, so that the IC can output a common electrode driver signal to the common electrode 14 on the first traveling line 12 in a display period of time.

Figure 11:
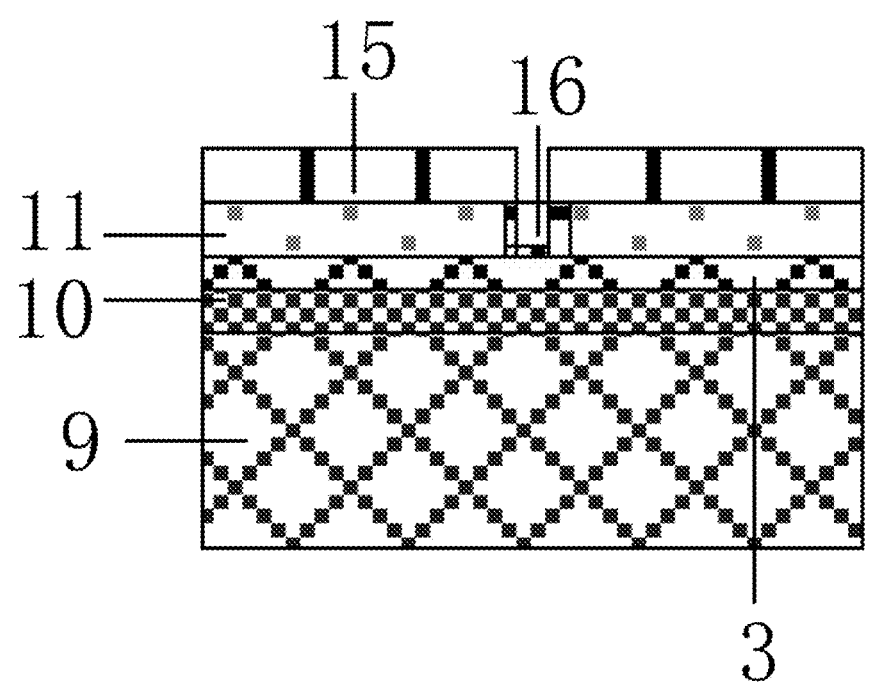
FIG. 11 is a schematic structural diagram of a section along the FF' line as illustrated in FIG. 7.

Furthermore, as illustrated in FIG. 7 to FIG. 11, '3' refers to a longitudinally arranged touch signal line, each column of pixels corresponds to a touch signal line 3, and '15' refers to a transversely arranged touch electrode transfer line (i.e., a second traveling line) configured to electrically connect touch electrodes 1 corresponding to sub-pixel areas in the same pixel. As illustrated in FIG. 11, the touch signal lines 3 and the second traveling lines 15 are connected through the through-holes 16 arranged at the PVA layer 11, and the touch signal lines 3 are connected with a controller arranged on the periphery of the touch panel, where the controller can be an IC, for example, and in a touch period of time, the IC provides the touch electrodes 1 with a touch driver signal on the touch signal lines 3, and the second traveling lines 15 connected with the touch signal lines 3, but the common electrodes 14 are not connected with the touch signal lines 3, so the common electrodes 14 do not receive any touch driver signal. In a display period of time, the IC provides the touch electrodes 1 with a common electrode driver signal on the touch signal lines 3 so that the touch electrodes 1 are reused as common electrodes in the display period of time.

Optionally, in the self-capacitive touch panel according to the embodiment of the disclosure, as illustrated in FIG. 7, the touch signal lines 3 are arranged perpendicular to the first traveling lines 12 and the second traveling lines 15. Of course, they can alternatively be arranged otherwise, and a particular arrangement pattern can be designed as needed in reality, although the embodiment of this disclosure will not be limited thereto.

Optionally, in the self-capacitive touch panel according to the embodiment of the disclosure, as illustrated in FIG. 7, a first traveling line 12 and a second traveling line 15 corresponding to any pixel are located respectively on different sides of the pixels. Of course, they can alternatively be arranged otherwise, and a particular arrangement pattern can be designed as needed in reality, although the embodiment of this disclosure will not be limited thereto.

Optionally, in the self-capacitive touch panel according to the embodiment of the disclosure, touch electrodes arranged corresponding to sub-pixel areas in each pixel can be connected with a corresponding second traveling line 15. Of course, alternatively touch electrodes 1 arranged corresponding to sub-pixel areas in a plurality of pixels can be connected with the same second traveling line 1, and a particular arrangement pattern can be designed as needed in reality, although the embodiment of this disclosure will not be limited thereto.

In summary, in this embodiment, for each pixel, a common electrode above a data line in the pixel is segmented into three components arranged respectively in three sub-pixel areas, where an electrode corresponding to the sub-pixel area located at the middle of three sub-pixels is a common electrode, electrodes corresponding to the sub-pixel areas on the left and the right to the middle sub-pixel are touch electrodes, and orthographic projections of the touch electrodes and the data line onto the self-capacitive touch panel are not overlapped with each other, so that there is no facing area between the touch electrodes and the data line, so the capacitance of a coupling capacitor between the touch electrodes and the data line can be reduced to some extent to thereby lower loads of the touch electrodes so as to charge the touch electrodes more quickly and better, thus improving the frequency of scanning a touch signal in a touch period of time, and a detection effect in the touch period of time; and since the touch electrodes are charged more quickly and better, display non-uniformity in a product with a high Pixels Per Inch (PPI) can be improved.

It shall be noted that in some embodiments, a common electrode block in each pixel is segmented into two components (one sub-pixel corresponds to a common electrode, and the other two sub-pixels share the same touch electrode), that is, the pixel includes three sub-pixels, and the touch electrode corresponds to two adjacent sub-pixel areas in any one of the pixels.

In the some embodiments, a common electrode block in each pixel is segmented into three components (each sub-pixel corresponds respectively to a component, where the middle sub-pixel corresponds to a common electrode, and each of the left and right sub-pixels corresponds respectively to a touch electrode), that is, the pixel includes three sub-pixels, and the touch electrodes correspond to two sub-pixel areas spaced from each other in any one of the pixels.

However, no matter how many electrodes into which the common electrode block is segmented, it is segmented into two parts, where one of the parts is a touch electrode(s) connected with the second traveling line, and the other part is a common electrode connected with the first traveling line.

Optionally, in the self-capacitive touch panel according to the embodiment of the disclosure, in any one of the pixels, the common electrode corresponds to the sub-pixel area of the same color; and taking the self-capacitive touch panel according to the first embodiment as an example, the self-capacitive touch panel includes red, green, and blue sub-pixels, for example, and as illustrated in FIG. 2, for three sub-pixels, a sub-pixel corresponding to a pixel electrode 4 on the right to the DD' line in FIG. 2 is a red sub-pixel, a sub-pixel corresponding to a pixel electrode 4 on the left to the DD' line is a green sub-pixel, and a sub-pixel corresponding to a pixel electrode 4 on the leftmost to the DD' line is a blue sub-pixel, so the electrode corresponding to the red sub-pixel area is a common electrode 14, and the electrodes corresponding to the blue and green sub-pixel areas are touch electrodes 1. Each pixel in the touch panel is arranged as illustrated in FIG. 2, that is, all the common electrodes 4 are arranged in the red sub-pixel areas, and all the touch electrodes 1 are arranged in the blue and green sub-pixel areas. Since the area of a common electrode may be different from the area of a touch electrode, there are different loads of the common electrode and the touch electrode when a corresponding common voltage signal is applied thereto, and the common electrodes 14 correspond to the sub-pixel areas of the same color so that there is uniform common electrode of the sub-pixels in the color corresponding to the common electrodes throughout the display area, thus resulting in uniform brightness of the respective pixels in the touch panel, and improving display uniformity of the display panel.

Based upon the same inventive idea, an embodiment of the disclosure provides a display device including the self-capacitive touch panel according to any one of the embodiments above of the disclosure.

An embodiment of the disclosure provides a display device, and the display device can be a device with a display function, or can be a desktop computer, a portable computer, a smart mobile phone, a tablet computer, a Personal Digital Assistant (PDA), etc. The display device can include a Central Processing Unit (CPU), a memory, an input/output device, etc., where the input device can include a keyboard, a mouse, a touch screen, etc., and the output device can include a display device, e.g., a Liquid Crystal Display (LCD).

The memory can include a Read Only Memory (ROM) and a Random Access Memory (RAM), and provide the processor with program instructions and data stored in the memory. The memory can be any computer readable and usable medium or data storage device, and include but will not be limited to a magnetic memory (e.g., a floppy disk, a hard disk, a magnetic tape, a magnetic-optical (MO) disk, etc.), an optical memory (e.g., a CD, a DVD, a BD, an HVD, etc.), a semiconductor memory (e.g., an ROM, an EPROM, an EEPROM, a nonvolatile memory (NAND FLASH), a solid hard disk (SSD), etc.) etc.

In summary, the self-capacitive touch panel according to the embodiments of the disclosure includes a display area including a plurality of data lines, and touch electrodes and common electrodes corresponding respectively to different areas, where orthographic projections of the touch electrodes and the data lines onto the self-capacitive touch panel are not overlapped with each other, so that the capacitances of the coupling capacitors between the touch electrodes and the data lines can be reduced to some extent to thereby lower loads of the touch electrodes so as to improve the frequency of scanning a touch signal in a touch period of time, and a detection effect in the touch period of time.

Evidently those skilled in the art can make various modifications and variations to the disclosure without departing from the spirit and scope of the disclosure. Accordingly the disclosure is also intended to encompass these modifications and variations thereto so long as the modifications and variations come into the scope of the claims appended to the disclosure and their equivalents.

The invention claimed is:

1. A self-capacitive touch panel, comprising a display area comprising a plurality of data lines, touch electrodes and common electrodes wherein:
   orthographic projections of the touch electrodes and the data lines onto the self-capacitive touch panel are not overlapped with each other;
   the common electrodes are arranged at a layer same as a layer on which the touch electrodes are and insulated from the touch electrodes, and orthographic projections of the common electrodes and the data lines onto the self-capacitive touch panel are overlapped with each other;
   wherein the display area further comprises a plurality of pixels, each of the plurality of pixels comprises a plurality of sub-pixels, wherein:
   the touch electrodes and the common electrodes correspond respectively to different sub-pixel areas;
   wherein all the common electrodes correspond to the sub-pixel areas of same color in each of the pixels.

2. The self-capacitive touch panel according to claim 1, wherein an extension direction of spaces between the touch electrodes and the common electrodes is parallel to an extension direction of the data lines.

3. The self-capacitive touch panel according to claim 1, wherein each of the pixels comprises three sub-pixels, and the touch electrodes correspond to two adjacent sub-pixel areas in each of the pixels.

4. The self-capacitive touch panel according to claim 1, wherein each of the pixels comprises three sub-pixels, and the touch electrodes correspond to two sub-pixel areas spaced from each other in each of the pixels.

5. The self-capacitive touch panel according to claim 1, further comprises first traveling lines connected with the common electrodes, and second traveling lines connected with the touch electrodes, wherein:
   the first traveling lines are configured to provide a common electrode driver signal; and
   the second traveling lines are configured to provide a touch driver signal in a touch period of time, and to provide a common electrode drive signal in the display period of time.

6. The self-capacitive touch panel according to claim 5 wherein the first traveling line and the second traveling line corresponding to each of the pixels are located respectively on different sides of the each of the pixels.

7. A display device, comprising the self-capacitive touch panel according to claim 1.

* * * * *